(No Model.) 2 Sheets—Sheet 1.

C. H. SAWYER.
WHEELED SCRAPER.

No. 389,251. Patented Sept. 11, 1888.

Witnesses,
S. A. Beardslee.
J. Jessen.

Inventor,
Charles H. Sawyer,
By his Attorneys
Paul, Sanford & Merwin.

N. PETERS, Photo-Lithographer, Washington, D. C.

(No Model.) 2 Sheets—Sheet 2.

C. H. SAWYER.
WHEELED SCRAPER.

No. 389,251. Patented Sept. 11, 1888.

Witnesses,
S. N. Beardslee.
J. Jessen.

Inventor,
Charles H. Sawyer.
By his Attorneys
Paul, Sanford & Merwin.

UNITED STATES PATENT OFFICE.

CHARLES H. SAWYER, OF MINNEAPOLIS, MINNESOTA.

WHEELED SCRAPER.

SPECIFICATION forming part of Letters Patent No. 389,251, dated September 11, 1888.

Application filed January 9, 1888. Serial No. 260,127. (No model.)

*To all whom it may concern:*

Be it known that I, CHARLES H. SAWYER, of Minneapolis, in the county of Hennepin and State of Minnesota, have invented certain Improvements in Wheeled Scrapers, of which the following is a specification.

My invention relates to improvements in wheeled scrapers; and it consists in attaching thereto an end-gate which is operated automatically with the pan or shovel. It is raised and placed entirely out of the way while the pan is being filled, and lowered into position as the pan is raised for transportation after being filled or loaded.

The object I have in view is to provide an implement of this class with a simple and efficient device for retaining the material within the pan while in the process of transportation, and which will in no way interfere with the loading or unloading of the pan.

My invention further consists in providing a simple device for protecting the axle-box of a machine of the class described from grit or dirt which falls upon or is necessarily brought in contact with the said hub.

My invention further consists in the construction and arrangement hereinafter described, and particularly pointed out in the claims.

Figure 1:
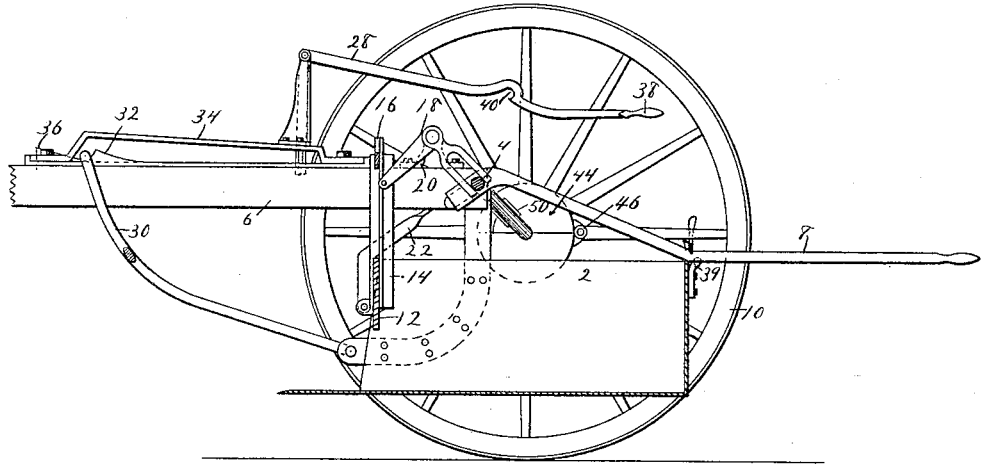
Figure 2:
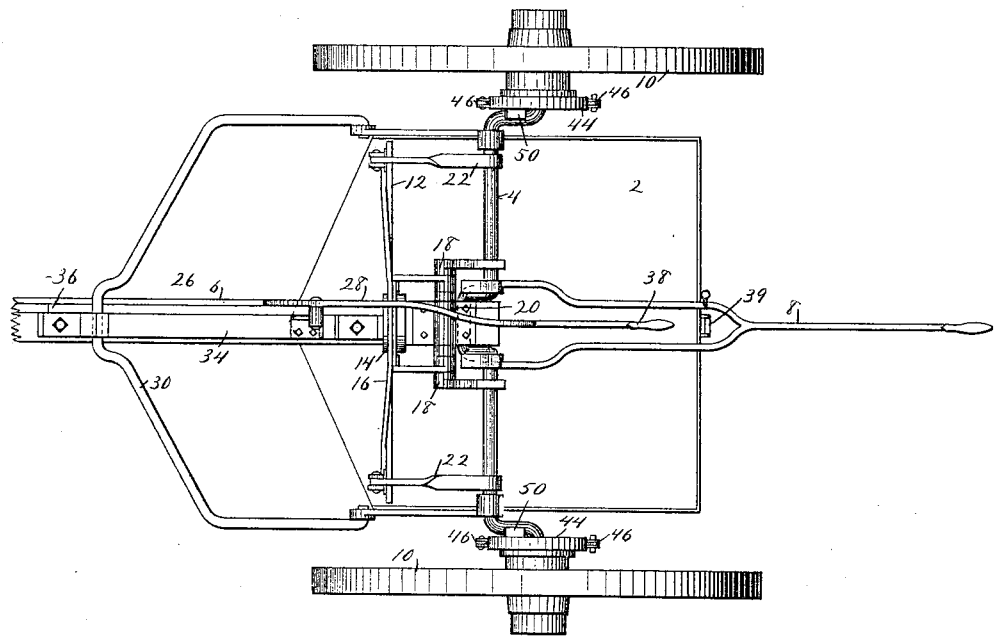
Figure 3:
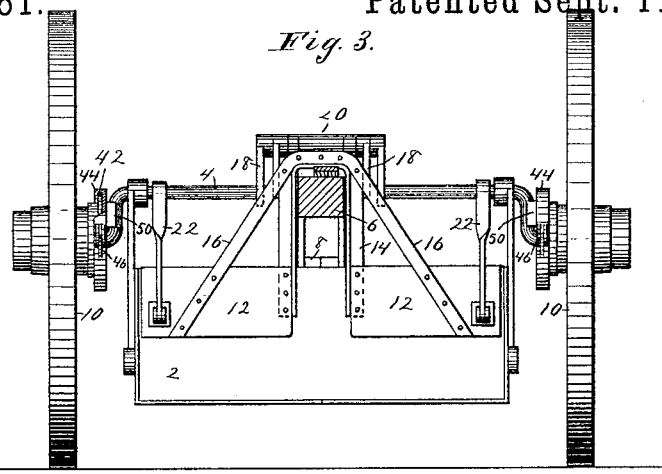
Figure 4:
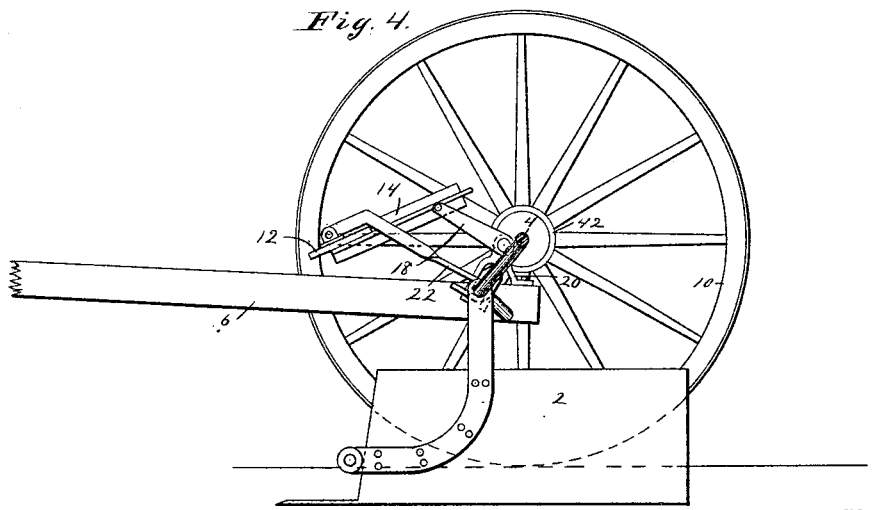
Figure 5:
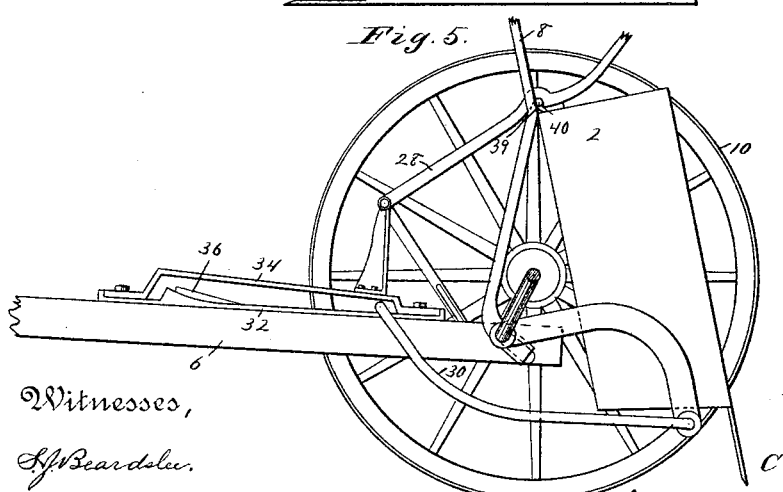
Figure 6:
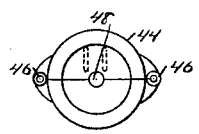

In the drawings which form a part of this specification, Figure 1 is a longitudinal section of a wheeled scraper embodying my invention. Fig. 2 is a plan view of the same. Fig. 3 is a front elevation. Figs. 4, 5, and 6 are details.

The construction and operation of the pan and its connection with the tongue is substantially similar to that described by me in my application for Letters Patent of the United States now pending before the Patent Office.

In the drawings, 2 represents the pan of the scraper, suspended from the crank-axle 4, having a tongue, 6, attached to an offset centrally located in the said axle, and an operating-lever, 8, secured to the crank-axle, whereby the tongue and pan are raised or lowered, the whole pivoted and supported upon the wheels 10 at each side of the pan.

12 represents an end-gate, preferably formed in two sections, one at each side of the tongue. These sections may be connected by a suitable angle-bar, 14, passing over the tongue and downward upon each side thereof and secured to the inner ends of the sections 12. Braces 16 may also be secured to the sections 12 and to the upper end of the angle-bar for the purpose of diagonally bracing and stiffening the said end-gate. Bell-crank levers 18 are pivoted in bearings 20, secured upon the tongue 6.

The bell-crank levers 18 are preferably located at each side of the tongue, the forward end of each being pivotally secured to the angle-bar 14. The rear ends of the said levers are preferably forked and embrace the axle 4 at either side of the offset, to which the tongue is attached. This offset being the pivotal support of the tongue and in advance of the main crank, as the main crank or axle is thrown downward the tongue will be drawn back and the pivot or bearing of the bell-crank lever 18 will be carried with it. The bell-crank lever 18 by this operation of the axle will be partially revolved or carried from the position shown in Fig. 1 to that shown in Fig. 4.

Reach-rods 22 are supported upon the axle 4 at one end and pivoted to the end-gate at the other. These reach-rods are preferably made of such a length that when the end-gate is in its normal position the reach-rods 22 brace and hold the said end-gate in a substantially-vertical position, as shown in Fig. 1. As the pan is lowered by the advancing or forward motion of the crank-axle, the distance between the said axle and the front of the pan will be decreased. The reach-rod attached to the axle and to the lower portion of the end-gate causes the said end-gate by the above-mentioned operation of the axle to be forced outward, and as the end-gate is also attached to the bell-crank lever it will be raised by it, as before described, and held in a suspended position, as denoted in Fig. 4, entirely out of the way of the material being collected by the pan or scraper. The end-gate will be held in this position until the pan, after being filled, is again raised, when the said end-gate will by the counter movement of the bell-cranks and reach-rods be drawn downward into the front of the pan against the material which is contained therein, and be so held while the scraper is being transferred to the place of delivery, and by this means the material will be retained within the pan.

I prefer to provide the tongue 6 with a slide, 26, which is allowed to move longitudinally of the tongue, and for this purpose I provide the arm or lever 28, which is preferably pivoted above the said slide to a standard upon the tongue, and is secured to the slide by a pin or bolt by which, when the arm is oscillated on its pivot or fulcrum, the slide 26 will be moved upon the tongue. The bail 30, secured to the front of the pan, passes over the slide 26, and is held in position upon the tongue by the projection 32 upon one side and the strap or guide-bar 34 upon the opposite side. The bail will be securely held in this position while the pan is being filled and transported.

The slide 26 is preferably provided with an incline, 36, preferably so located upon the said slide that when the slide is at its forward limit it will be just in front of the bail. I also prefer to provide a handle or lever, 38, attached to and operating the arm 28. As this handle is raised, the arm 28 is drawn back, carrying with it the slide 26, attached thereto, and forcing the incline 36 under the said bail, thus raising it out of the recess in which it is held and allowing it to pass over the projection 32. It will be understood that the lever 8 is to be connected to the pan when the parts are in position shown in Fig. 1 by a catch or other suitable device. This device I have not shown, as it forms no part of my present invention. It may be the same as that shown in my former application hereinbefore referred to. When the bail is released and the lever 8 is raised, the nose of the pan will be depressed, causing it to strike the surface and be carried over and dumped.

A catch, 39, may be placed upon the rear of the pan and a recess, 40, corresponding thereto, may be formed in the handle 38. As the pan is forced about its axis in dumping, the catch 39 is brought in contact with the lever or handle 38, which is raised thereby, and the catch is allowed to pass into the recess 40, and is held in this recess until released by the raising of the lever. The handle 38 thus performs two functions in the dumping of the pan—first, to release the bail from its fastenings by means of the incline 36, and, second, to retain the pan in its reversed position after being dumped.

I prefer to provide the axle and wheel-hub with a device for preventing the sand and grit from falling or working into the axle-boxes. For this purpose I construct the hub with a flange, 42, around its inner extremity.

A circular box, 44, is formed of two semicircular sections, which are provided with ears 46, oppositely placed upon the division-line of the boxes. These ears are fitted together and held by suitable bolts or pins. The inner end of this box is provided with an opening, 48, which fits closely to the axle 4, and the opening in the outer end fits the hub of the wheel, and a recess is formed between the openings in the two ends for the reception of the outwardly-projecting flange 42. Projections 50 are preferably provided upon the inner surface or end of said box, and the crank-shaft is embraced between these two projections, and the box is thus prevented from turning with the wheel. As the box is thus held stationary with the axle, there will be no tendency for the sand or grit to be drawn into the box from the inner end, or where the axle passes through, and the flange 42 upon the hub, extending upward into the recess in the said box, effectually prevents anything from passing into it from the outer or hub side.

The box is easily adjusted, as it is only necessary to remove one of the pins or bolts through the ear 46, when the two halves can be separated and attached over the hub, the pin can be replaced, and the whole is secured in position.

What I claim is—

1. In a wheeled scraper, the combination, with the axle provided with the cranks and the central offset and the tongue secured to said offset, of the end-gate attached to said tongue and operated by said axle, substantially as and for the purpose specified.

2. In a wheeled scraper, the combination, with the axle 4 and the tongue 6, of the end-gate 12, and the bell-crank levers 18, attached to said end-gate and to the axle 4 and supported upon the tongue, whereby by the partial revolution of the axle the end-gate is raised, substantially as described.

3. In a wheeled scraper, the combination, with the axle 4 and the tongue 6, of the end-gate 12, the bell-crank levers 18, attached thereto, and the reach-rods 22, secured to the end-gate and to the axle 4, substantially as described.

4. In a wheeled scraper, the combination, with the pan and the bail 30, of the slide 26, having the incline 36, arranged to bear against the under side of the bail, and the lever 28, for operating the said slide and raising the bail, substantially as described.

5. In a wheeled scraper, the combination, with the pan, the bail 30, and the slide 26, of the lever or handle 38, having the notch 40, and the catch 39, secured to the pan and arranged to be engaged by said notch, substantially as described.

In testimony whereof I have hereunto set my hand this 30th day of December, 1887.

CHARLES H. SAWYER.

In presence of—
A. M. GASKELL,
R. H. SANFORD.